US012071298B1

(12) United States Patent
Gil

(10) Patent No.: US 12,071,298 B1
(45) Date of Patent: Aug. 27, 2024

(54) GARBAGE BASKET STORING MECHANISM FOR CABINETS

(71) Applicant: David Gil, Naples, FL (US)

(72) Inventor: David Gil, Naples, FL (US)

( * ) Notice: Subject to any disclaimer, the term of this patent is extended or adjusted under 35 U.S.C. 154(b) by 0 days.

(21) Appl. No.: 18/652,735

(22) Filed: May 1, 2024

(51) Int. Cl.
*B65F 1/14* (2006.01)

(52) U.S. Cl.
CPC .................................. *B65F 1/1436* (2013.01)

(58) Field of Classification Search
CPC ...... B65F 1/1436; B65F 1/1426; B65F 1/006; B65F 1/1623; A47B 77/18; A47B 96/16; A47B 77/10; A47B 88/40; A47B 2210/0059
See application file for complete search history.

(56) References Cited

U.S. PATENT DOCUMENTS 3,425,765 A * 2/1969 William ................ B65F 1/1436 312/274
5,215,365 A * 6/1993 Godin .................... A47B 77/18 16/370
5,474,374 A * 12/1995 Sandvig ................. A47B 77/18 312/274
6,962,301 B1 * 11/2005 Chang ................... B65F 1/1473 241/236
7,624,915 B2 * 12/2009 Dembowiak ......... B65F 1/1415 220/495.08
10,654,648 B1 * 5/2020 Rodriguez ............. A47B 96/16
2007/0018545 A1 * 1/2007 Calabria ................ A47B 77/10 312/311
2010/0253191 A1 * 10/2010 Backhaus .............. A47B 96/16 312/309
2012/0126676 A1 * 5/2012 Fistonich ............... A47B 77/18 312/319.1
2013/0002100 A1 * 1/2013 Badri .................... B65F 1/1436 312/212
2020/0002090 A1 * 1/2020 Wolfenden ................ B65F 1/16
2023/0243516 A1 * 8/2023 Stöhr .................... F24C 15/162 126/19 R

FOREIGN PATENT DOCUMENTS

EP 1717166 A1 * 11/2006 ............ B65F 1/1436

* cited by examiner

*Primary Examiner* — Hiwot E Tefera
(74) *Attorney, Agent, or Firm* — Ruben Alcoba, Esq.

(57) ABSTRACT

A garbage basket storage mechanism comprises of a pair of linear slide bars that attaches to a cabinet base. A pair of linear upper slide guide mounts that mount on the pair of linear slide bars. A second base that attaches to the pair of linear upper slide guide mounts. A swivel mount that attaches to the base of the cabinet. An triangle force transmitting connector (hereinafter "TFTC") that has a left, a middle, and a right attachment point, the left attachment point attaches to the swivel mount. A first linear bar attaches to the middle attachment point of the TFTC. A pivot attachment that attaches to a cabinet door, the first linear bar attaches to the pivot. A second linear bar that attaches to the right attachment point of the TFTC. And, a second swivel mount attaches to the second base, The second linear bar attaches to the second swivel mount.

1 Claim, 4 Drawing Sheets

GARBAGE BASKET STORING MECHANISM FOR CABINETS

BACKGROUND

The present invention pertains to a garbage basket storing mechanism for a cabinet that is actuated by the circular movement of a cabinet door.

The invention is a mechanism that facilitates the exit and entrance of a garbage basket into a cabinet when a cabinet door is opened or closed.

Presently there is a garbage basket mechanism that has a base that is placed on a sliding mechanism within the cabinet that allows a garbage basket to be pulled out and pushed into the cabinet that works independently from the door.

The present garbage basket mechanism works as follow: 1. The cabinet door is opened; 2. Then, the garbage basket is pulled out of the cabinet via the sliding mechanism when an item is to be placed into the garbage basket; 3. then garbage basket is pushed into the cabinet; and 4. Lastly closing the door. As can be seen, the present mechanism requires 4 distinct steps to access and store the garbage basked.

The present invention will provide a new mechanism that will only require two steps for the garbage basket to come out of the cabinet, and the mechanism will be controlled by the opening and the closing of the cabinet door.

SUMMARY

The present invention is directed to a garbage basket storing mechanism for a cabinet.

A garbage basket storage mechanism comprises of a pair of linear slide bars that attaches to a cabinet base. A pair of linear upper slide guide mounts that mount on the pair of linear slide bars. A basket that attaches to the pair of linear upper slide guide mounts. A swivel mount that attaches to the base of the cabinet. A triangle force transmitting connector (hereinafter "TFTC") that has a left, a middle, and a right attachment point, the left attachment point attaches to the swivel mount. A first linear bar attaches to the middle attachment point of the TFTC. A pivot attachment that attaches to a cabinet door, the first linear bar attaches to the pivot. A second linear bar that attaches to the right attachment point of the TFTC. And, a second swivel mount attaches to the basket, The second linear bar attaches to the second swivel mount.

An object of the present invention is to provide an improved garbage basket storing mechanism for cabinets.

Another object of the present invention is to provide a garbage basket storing mechanism that does not require one to manually pull and push the garbage basket within a cabinet.

BRIEF DESCRIPTION OF THE DRAWINGS

These and other features, aspects, and advantages of the present invention will become better understood with regards to the following description, appended claims, and drawings where:

DESCRIPTION

Figure 1:
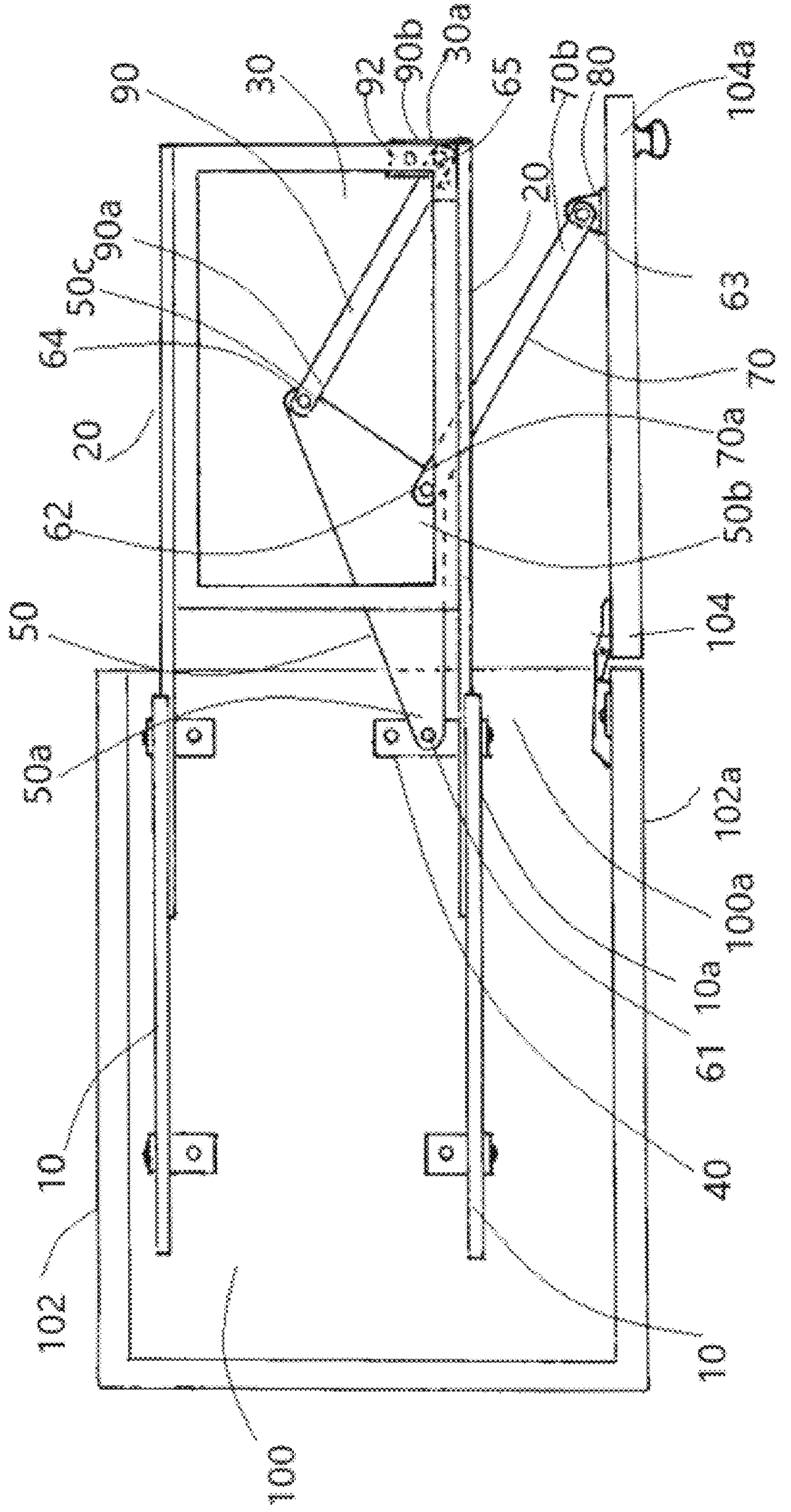
FIG. 1 is a top plan view of the garbage basket storing mechanism installed within a cabinet.

As seen in FIGS. 1-4, the present invention is a garbage basket storing mechanism for a cabinet.

The garbage basket storage mechanism comprises a pair of linear slide bars 10 that are fixedly attached to a base 100 of a cabinet 102. A left linear slide bar **10*a* of the pair of linear slide bars 10 is at least two and three quarters on an inch from a left side 102*a* of cabinet. A pair of linear upper slide guide mounts 20 that mount on the pair of linear slide bars 10. A second base 30 that is attached to the pair of linear upper slide guide mounts 20. A swivel mount 40 that is attached to a front lateral side 100*a* of the base 100 of the cabinet 102. A triangle force transmitting connector 50 that has a left attachment point 50*a*, a middle attachment point 50*b*, and a right attachment point 50*c*, the left attachment point 50*a* is defined on a left corner of the triangle force transmitting connector 50, the left attachment point 50*a* is attached to the swivel mount 40 via a first pin 61. A first linear bar 70 that defines a first end attachment point 70*a* and a second end attachment point 70*b*, the first end attachment point 70*a* is attached to the middle attachment point 50*b* of the triangle force transmitting connector 50 via a second pin 62. A pivot attachment 80 that is attached to a door 104 of the cabinet 102 at an outer position of the door 104*a*, the second end attachment point 70*b* of the first linear bar 70 attaches to the pivot attachment 80 via a third pin 63. A second linear bar 90 that defines a first attachment point 90*a* and a second attachment point 90*b*, the first attachment point 90*a* attaches to the right attachment point 50*c* of the triangle force transmitting connector 50 via a fourth pin 64. And, a second swivel mount 92 that is attached to an inner front corner edge 30*a* of the second base 30, the second attachment point 90*b* of the second linear bar 90 attaches to the second swivel mount 92 via a fifth pin 65**.

In an embodiment of the present invention, the second base 30 is a basket 30.

Figure 2:
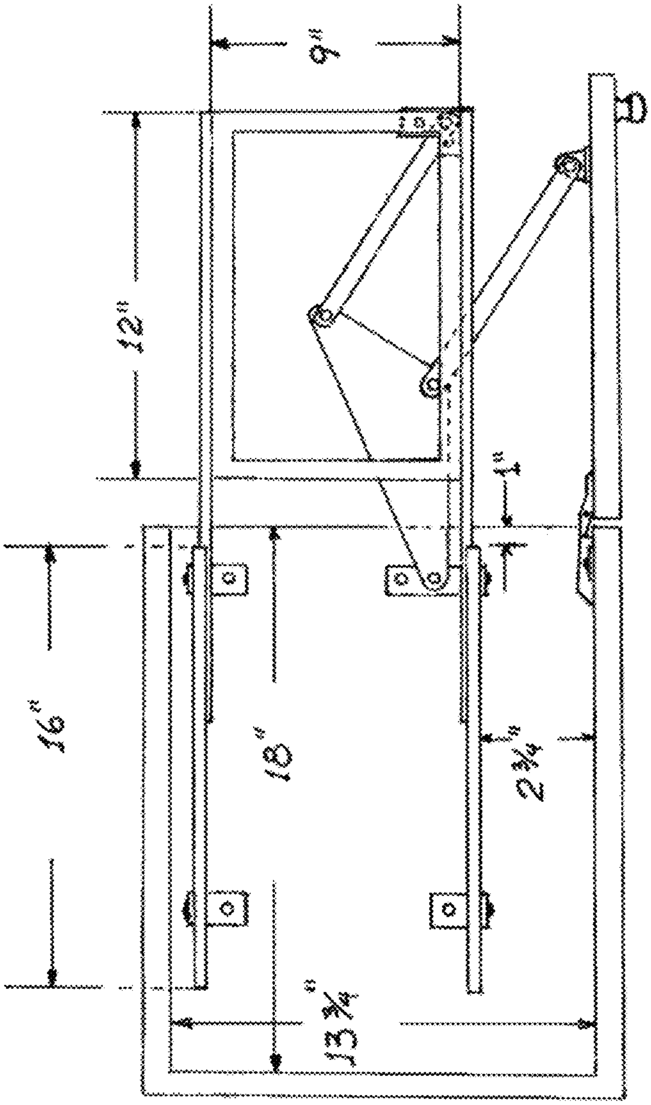
FIG. 2 is a top plan view of an embodiment of the garbage basket storing mechanism showing its measurements.
Figure 3:
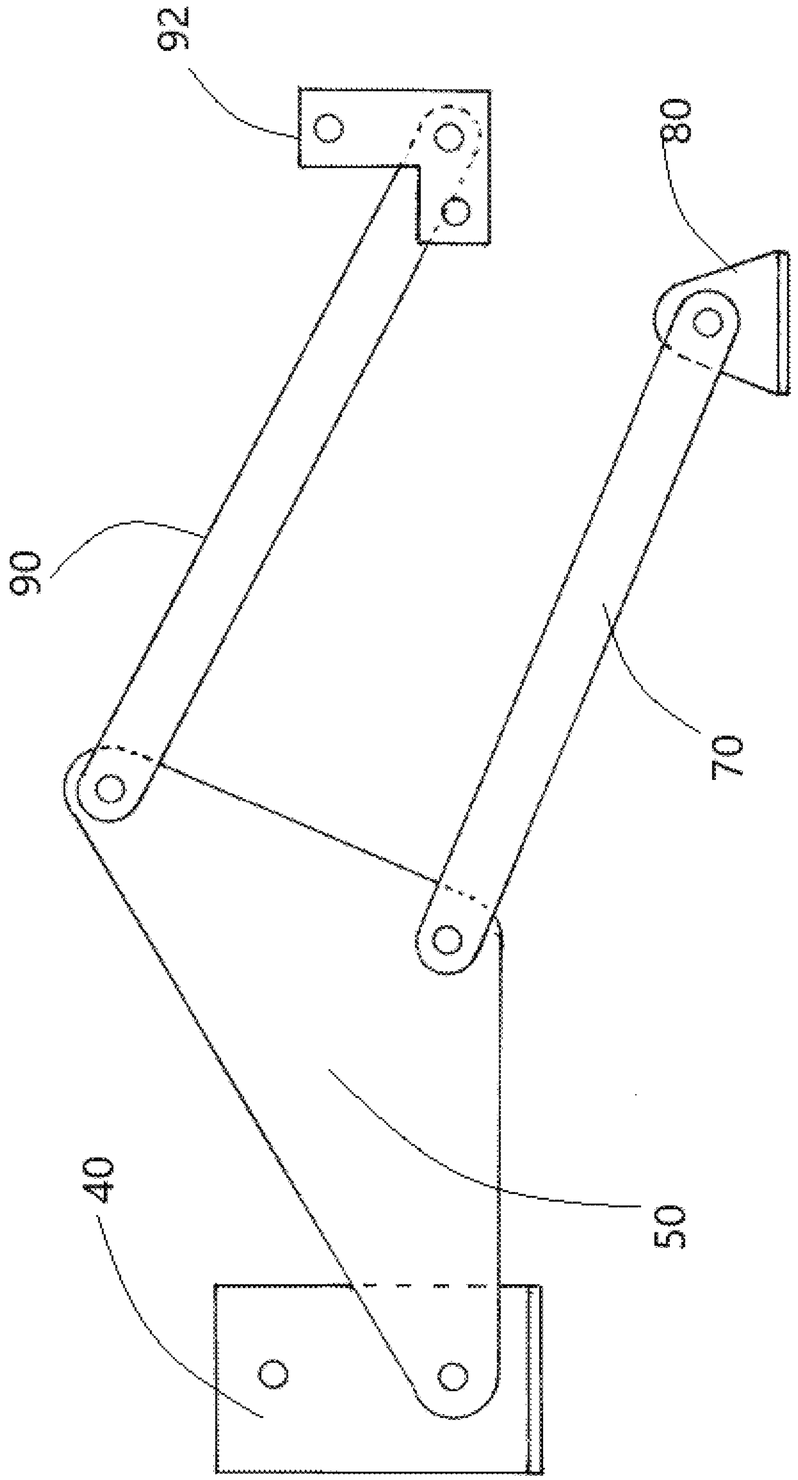
FIG. 3 is a top plan view of the garbage basket storing mechanism.

As seen in FIG. 2, in a preferred embodiment, the second base 30 measures twelve inches in length and nine inches in width.

Figure 4:
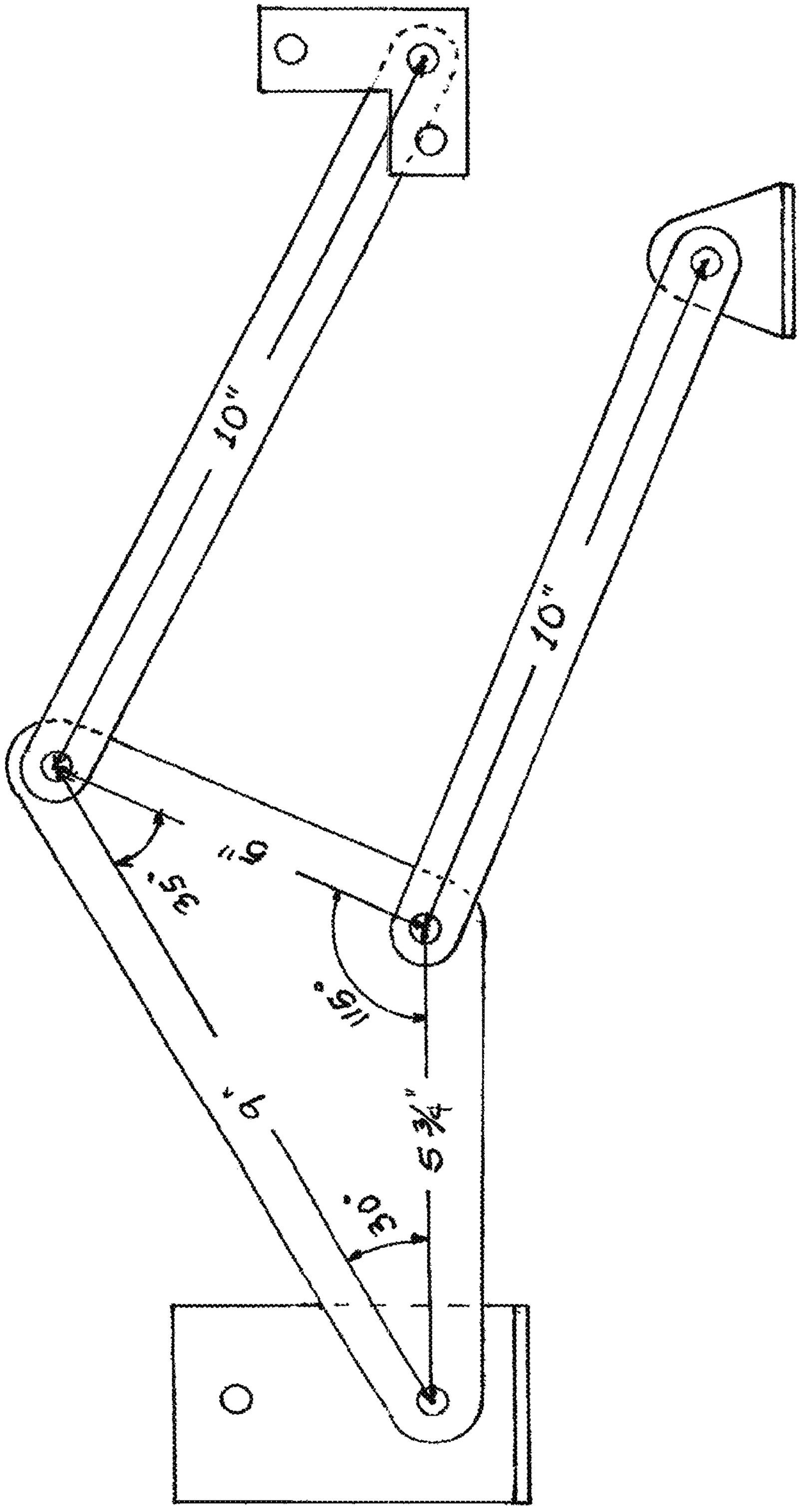
FIG. 4 is a top plan view of an embodiment of the garbage storing mechanism with measurements.

As seen in FIG. 4, in preferred embodiments, the triangle force transmitting connector 50 has an angle that measures thirty degrees, an angle that measures thirty-five degrees, and an angle that measures one hundred and fifteen degrees. In the preferred embodiment, the first linear bar 70 and the second linear 90 bar both measure ten inches. This embodiment holds a 7.5 gallon garbage basket.

An advantage of the present invention is that it provides an improved garbage basket storing mechanism for cabinets.

Another advantage of the present invention is that it provides a garbage basket storing mechanism that does not require one to manually pull and push the garbage basket within a cabinet.

The embodiments of the garbage basket storing mechanism herein are exemplary and numerous modifications, combinations, variations, and rearrangements can be readily envisioned to achieve an equivalent result, all of which are intended to be embraced within the scope of the appended claims. Further, nothing in the above-provided discussions of the garbage basket storing mechanism should be construed as limiting the invention to an embodiment or a combination of embodiments. The scope of the invention is defined by the description, drawings, and claims.

What is claimed is:

1. A garbage basket storing mechanism for a cabinet, the garbage basket storage mechanism comprises:

a pair of linear slide bars that are fixedly attached to a base of a cabinet, a left linear slide bar of the pair of linear slide bars is at least two and three quarters on an inch from a left side of the cabinet;

a pair of linear upper slide guide mounts that mount on the pair of linear slide bars;

a second base that is attached to the pair of linear upper slide guide mounts;

a swivel mount that is attached to a front lateral side of the base of the cabinet;

a triangle force transmitting connector that has a left attachment point, a middle attachment point, and a right attachment point, the left attachment point is defined on a left corner of the triangle force transmitting connector, the left attachment point is attached to the swivel mount via a first pin;

a first linear bar that defines a first end attachment point and a second end attachment point, the first end attachment point is attached to the middle attachment point of the triangle force transmitting connector via a second pin;

a pivot attachment that is attached to a door of the cabinet at an outer position of the door, the second end attachment point of the first linear bar attaches to the pivot attachment via a third pin;

a second linear bar that defines a first attachment point and a second attachment point, the first attachment point attaches to the right attachment point of the triangle force transmitting connector via a fourth pin; and a second swivel mount that is attached to an inner front corner edge of the second base, the second attachment point of the second linear bar attaches to the second swivel mount via a fifth pin.

* * * * *